United States Patent [19]

Murdock

[11] Patent Number: 4,974,502
[45] Date of Patent: Dec. 4, 1990

[54] TACO COOKING AND SERVING APPARATUS

[76] Inventor: Robert L. Murdock, 1609 Bedford, Midland, Tex. 79701

[21] Appl. No.: 370,815

[22] Filed: Jun. 23, 1989

[51] Int. Cl.⁵ ............................................. A47J 43/18
[52] U.S. Cl. ..................................... 99/426; 99/450; 211/153; 211/182
[58] Field of Search ..................... 99/426, 441, 450; 211/181, 153, 182

[56] References Cited

U.S. PATENT DOCUMENTS

| 158,858 | 1/1875 | Mitchell | 99/450 |
|---|---|---|---|
| 446,855 | 2/1891 | Earle | 99/426 |
| 471,134 | 3/1892 | Noland | . |
| 828,694 | 8/1906 | Weeks | 211/181 X |
| 1,004,996 | 10/1911 | Collis | 211/181 X |
| 1,334,293 | 3/1920 | Dean | 211/153 X |
| 2,044,615 | 6/1936 | Kennedy | 99/441 X |
| 2,570,374 | 10/1951 | Pompa | 99/416 |
| 2,604,843 | 7/1952 | Davis | 99/450 |
| 3,224,081 | 12/1965 | Richter | 211/153 X |
| 3,511,172 | 5/1970 | Jones | 99/426 |
| 4,004,501 | 1/1987 | Guerrero | 99/426 |
| 4,074,102 | 2/1978 | Asen | 99/426 X |
| 4,483,446 | 11/1984 | Miller et al. | 211/153 |
| 4,559,869 | 12/1985 | Hogan | 99/426 |

FOREIGN PATENT DOCUMENTS

| 356400 | 7/1922 | Fed. Rep. of Germany | 99/426 |
|---|---|---|---|
| 1140591 | 12/1962 | Fed. Rep. of Germany | 211/153 |
| 468933 | 7/1914 | France | 99/426 |

Primary Examiner—Timothy F. Simone
Assistant Examiner—Stephen F. Gerrity
Attorney, Agent, or Firm—Litman, McMahon & Brown

[57] ABSTRACT

A taco cooking and serving apparatus including a flat bottom pan and a rack removably supported by the pan. The rack includes a plurality of elongate rods spaced to receive uncooked taco shells therebetween. The rods are connected at opposite ends thereof to a pair of end plates, each end plate having an upper flange adapted to be grasped by a user. The rods are preferably constructed of a heat retaining material so as to help keep taco shells and tacos hot after cooking.

4 Claims, 1 Drawing Sheet

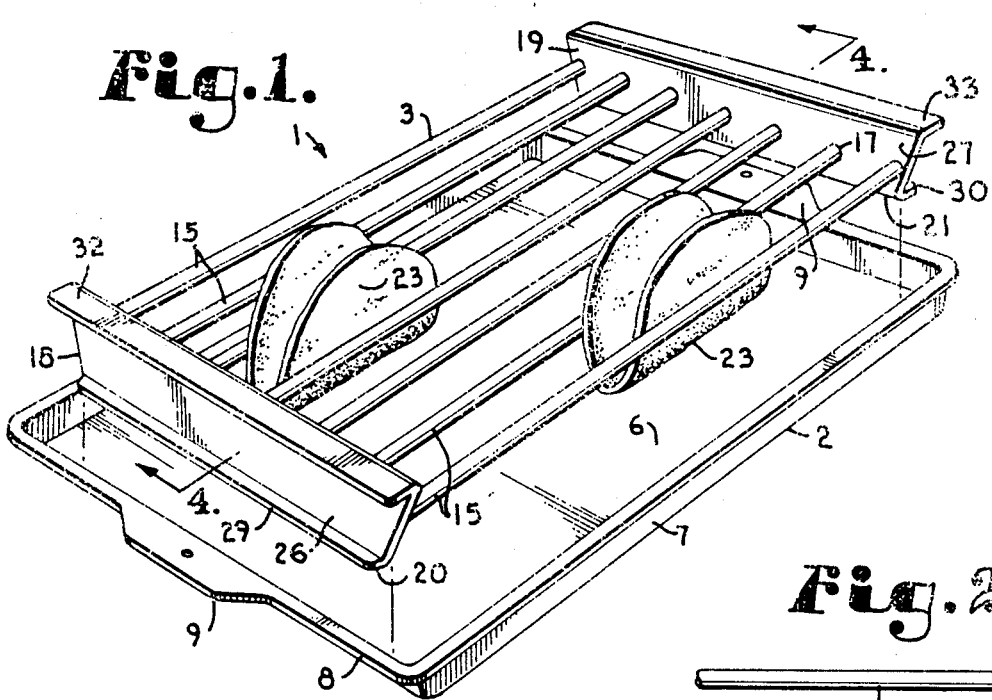
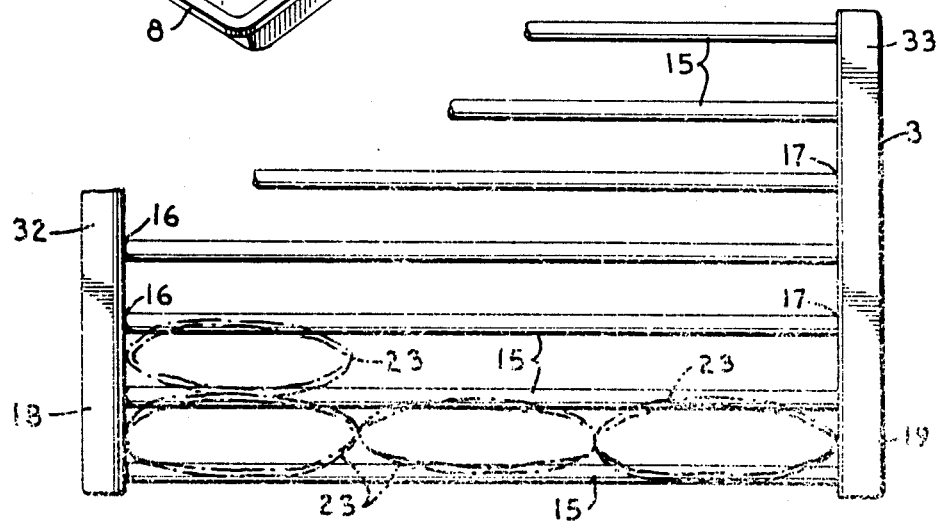
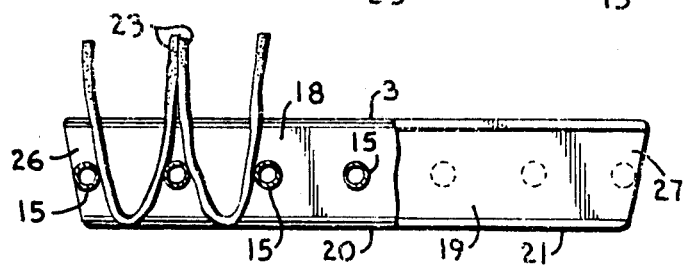
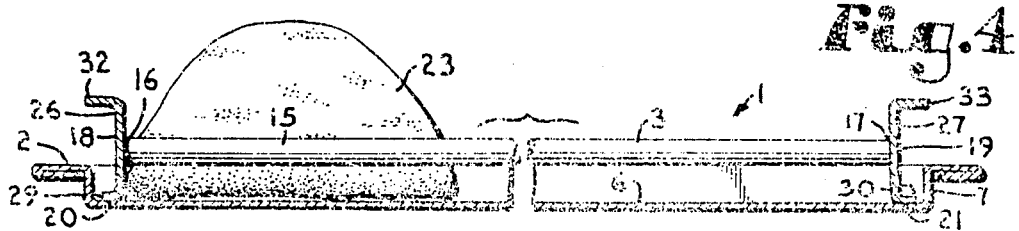

TACO COOKING AND SERVING APPARATUS

BACKGROUND OF THE INVENTION

The present invention relates to an apparatus for assisting in the cooking of taco shells and thereafter allowing tacos made from the shells to be served from an upright position.

While tacos have become a very popular food product, tacos present a substantial problem in both cooking and serving, since they have a rather cumbersome shape. In particular, the taco shell is designed from a round tortilla that is bent to have a relatively arcuate center and two upstanding sides or ears. If the shells are cooked with one of the sides lying down, the resulting shell is normally flat or lopsided. In general, it has been found that the best position in which to cook the shells has either been in an upright position when baking or in a preformed position that is held by a special tool when deep fat frying.

Once the shells are cooked, they are relatively warm and cumbersome to fill with stuffing. It is preferred that the shells be held in an upright position after cooking so that stuffing such as ground beef, lettuce and cheese can be easily dropped into the shell from above. However, the present methods of cooking normally require that the shells be removed from the device in which they are cooked and then placed on plates or other holders specifically designed for the shells. This is time consuming and requires two separate utensils to do the two different jobs. Therefore, it is desirable to have an apparatus which allows the cooking of the shells in an upright position and yet also allows the shells to be then removed to an area for filling and serving while maintaining the shells in an upright position.

It is also desirable that such an apparatus be able to take advantage of conventional devices found in the kitchen, such as flat bottom or cookie pans. Finally, it is also desirable that the apparatus be constructed of heat retaining materials so as to aid in keeping the taco shells warm during stuffing of the shells and serving of the tacos.

OBJECTS OF THE INVENTION

Therefore, the objects of the present invention are: to provide a taco shell cooking and serving apparatus that allows the shells to be baked in an upright position, as well as filled and served in its position; to provide such an apparatus incorporating a flat bottom pan and a rack; to provide such an apparatus wherein the rack includes a plurality of elongate rods connected at opposite ends thereof by end plates, each having a flange for grasping by a user; to provide such an apparatus wherein the elongate rods are constructed of a heat retaining material; to provide such an apparatus wherein the rack is easily removed from the pan for serving, cleaning or the like; and to provide such an apparatus which is especially easy to use, inexpensive to manufacture and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a taco cooking and serving apparatus in accordance with the present invention, including a flat bottom pan and a rack with tacos positioned therein and further showing the rack partially removed from the pan.

FIG. 2 is an enlarged and fragmentary top plan view of the rack showing tacos positioned therein in phantom.

FIG. 3 is an enlarged side elevational view of the rack with tacos positioned therein, having portions thereof broken away to show detail.

FIG. 4 is an enlarged and fragmentary cross-sectional view of the apparatus with taco shells positioned therein, taken along line 4—4 of FIG. 1.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a taco cooking and serving apparatus in accordance with the present invention generally indicated by the reference numeral 1. The apparatus 1 comprises a flat bottom pan 2 and a rack 3.

The pan 2 is preferably a conventional device as found in most kitchens for baking cookies or the like including a fairly large and flat surface 6 with relatively short and interconnected side walls 7 extending upwardly from the surface 6. The side walls 7 may also include an outwardly projecting flange 8 on opposite sides thereof and extending out somewhat further to form hand holds at opposite ends of the major axis of the pan 2.

The rack 3 includes a plurality of elongate, cylindrical rods 15 joined at opposite ends 16 and 17 thereof to a pair of side plates 18 and 19. The rods 15 are sized of such a length such that when joined with the side plates 18 and 19, the overall rack 3 is positionable upon the pan surface 6 and generally snugly encircled by the side walls 7. The rods 15 are spaced approximately the preferred cooking width of a taco shell 23. The rods 15 are also attached to the side plates 18 and 19 at a distance from bottoms 20 and 21 of the side plates 18 and 19 respectively so as to engage the taco shells 23 placed between two such rods 15 at an intermediate location along each of the taco shells 23, so as to support such shells 23 during cooking. The side plates 18 and 19 include central, generally vertically aligned planar members 26 and 27 respectively. The rods 15 are attached by welding or the like to the central members 26 and 27 at equally spaced locations therealong. Attached to the lower end of each of the central members 26 and 27 is a lower flange 29 and 30 respectively. The lower flanges 29 and 30 extend outwardly from the central members 26 and 27 respectively in the direction opposite the attachment of the rods 15 thereto.

Also attached to the central members 26 and 27 and extending opposite the rods 15 are upper flanges 32 and 33. The upper flanges 32 and 33 extend sufficiently out from the central members 26 and 27 respectively to allow a user to grasp beneath the upper flanges 32 and 33 to raise the rack 3 from the pan 2 for purposes of serving tacos or for cleaning the apparatus 1. In this manner, the rack 3 can be placed on a table or the like for aiding in the filling or stuffing of other ingredients into the taco shells 23 or for serving the tacos. Preferably, the rods 15 are constructed of a material such as aluminum that has a sufficient reservoir of heat to maintain the shells 23 in a heated state for a period of time subsequent to removal of the apparatus 1 from an oven.

In particular, in use, the apparatus 1 is constructed as shown in FIG. 4 with the rack 3 placed on and within the sides 7 of the pan 2 and taco shells 23 are positioned between the rods 15 so as to be supported thereby. Thereafter, the apparatus 1 is placed in an oven such that the shells 23 are cooked and the apparatus 1 is then removed from the oven. The shells 23 may be stuffed with taco fillings while the rack 3 remains on the pan 2 or the rack 3 may be removed from the pan 2 with the taco shells 23 therein for transfer to a table or the like for stuffing and serving.

It is to be understood that while certain forms of the present invention have been illustrated and described herein, it is not to be limited to the specific forms or arrangement of parts described and shown.

What is claimed is:

1. A taco cooking and serving apparatus comprising:
   (a) a rack having a plurality of elongate rods;
   (b) said rack further having a pair of generally elongate planar side plates; said side plates being sized and shaped to extend between outer rods on each side of said rack; said side plates further being shaped so as to extend downwardly from said rods such that, when said rack is placed with lower ends of said side plates on a planar surface, said rods are attached to and spaced from said lower ends of said side plates so as to space said rods such that pairs of spaced rods are adapted to receive taco shells therebetween and further spacing said rods from the bottom of said side plates such that said rods are maintained in a raised position by said side plates and adapted to engage taco shells in an intermediate position therealong; and
   (c) each of said side plates include an upper flange extending outwardly therefrom opposite said rods; each of said upper flanges being near an upper end of a respective one of said side plates and extending generally perpendicularly therefrom and substantially the entire length thereof so as to be adapted to be grasped by a user thereof in lifting said rack.

2. The apparatus according to claim 1 including:
   (a) a flat bottom pan having a planar surface cooperatively receiving said rack thereupon.

3. The apparatus according to claim 1 wherein:
   (a) said rods are constructed of material having a relatively high capacity to retain heat.

4. A taco cooking and serving apparatus comprising, when in use:
   (a) a flat bottom pan having a relatively large planar surface and relatively short side walls extending upwardly from said surface near the periphery thereof;
   (b) a rack having a plurality of elongate rods and a pair of side plates;
   (c) said elongate rods being attached to said end plates near opposite ends of said rods and horizontally spaced from one another so as to be adapted to receive taco shells therebetween; said rods further being spaced from a bottom end of said side plates so as to be held in a raised position by said end plates so as to be adapted to engage said taco shells at an intermediate location therealong; and
   (d) each of said side plates being generally elongate and flat with planar vertical sides and extending between rods on opposite sides of said rack; each of said side plates including an upper flange extending outwardly therefrom opposite said rods; each of said flanges extending generally perpendicularly from the top of said end plates and being positioned substantially above said pan such that said flanges are adapted to being grasped by a user to remove said rack from said pan; and said rack being removable rom said pan while being adapted to hold taco shells between said rods.

* * * * *